Patented Sept. 11, 1951

2,567,199

UNITED STATES PATENT OFFICE 2,567,199

INSECT REPELLENT

Marshall Gates, Bryn Mawr, Pa., assignor to the United States of America as represented by the Secretary of the Army No Drawing. Application January 10, 1949,
Serial No. 70,135

8 Claims. (Cl. 167—30)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to insect repellents.

I have found that the application of cyclohexyl phenyl ketone, a compound having the structural formula

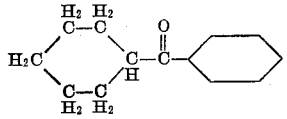

to the human skin or to a fabric affords effective protection against insect bites, by repelling insects, particularly *Anopheles quadrimaculatus* and *Aedes aegypti*.

A number of tests to measure the repellency of cyclohexyl phenyl ketone against *Aedes aegypti* was conducted by smearing the compound on the arms of test personnel, who then thrust their arms into cages containing *Aedes aegypti*. The arms were exposed for 30-minute intervals at 3 minutes each until the first insect bite.

Tests to measure the repellency of cyclohexyl phenyl ketone impregnated fabrics against *Aedes aegypti* were conducted by uniformly impregnating mercerized cotton hose with the compound at a rate equivalent to 3.3 gms. per sq. ft., drawing the dried hose over the arms of test personnel, who then thrust their covered arms into cages containing *Aedes aegypti* for 1 to 2 minutes. If no bites or less than 5 bites were received, the tests were repeated each successive day until 5 or more bites during one exposure were received.

It was found that the application of cyclohexyl phenyl ketone affords protection against *Aedes aegypti* for an average of 234 minutes. Against *Anopheles quadrimaculatus*, an average repellency time of 53 minutes was noted in analogous tests.

It was found that fabric impregnated with cyclohexyl phenyl ketone remained repellent to *Aedes aegypti* for over 10 successive days.

For ease of application to the skin, the cyclohexyl phenyl ketone may be incorporated in a suitable inert liquid or solid carrier such as mineral oil, alcohol, petrolatum, etc. For ease and uniformity of application to the fabric, the cyclohexyl phenyl ketone may be applied to the fabric in an inert solvent, such as alcohol, ether, etc.

Having thus described my invention, I claim:

1. An insect-repellent fabric comprising fabric impregnated with cyclohexyl phenyl ketone.

2. An insect repellent composition comprising cyclohexyl phenyl ketone in a non-gaseous inert organic carrier.

3. An insect repellent composition comprising cyclohexyl phenyl ketone in alcohol.

4. An insect repellent composition comprising cyclohexyl phenyl ketone in ether.

5. An insect repellent composition comprising cyclohexyl phenyl ketone in oil.

6. An insect repellent composition comprising cyclohexyl phenyl ketone in petrolatum.

7. A process of repelling insects comprising applying cyclohexyl phenyl ketone to the region from which the insects are to be repelled.

8. A process of repelling insects comprising applying cyclohexyl phenyl ketone to the skin.

MARSHALL GATES.

REFERENCES CITED

The following references are of record in the file of this patent:

UNITED STATES PATENTS

| Number | Name | Date |
| --- | --- | --- |
| 2,400,006 | Jones et al. | May 7, 1946 |

OTHER REFERENCES

Sabatier et al.: Synthesis of the Alcohols of the Cyclohexane Series, from Chemical Abstracts, vol. 2, p. 793, 1908.

OSRD Insect Control Comm. Rept. No. 28, Interim Report No. O-94, May 18, 1945, publication date August 1, 1947. 167-O. S. R. D.